(12) United States Patent  
Watson

(10) Patent No.: US 8,169,336 B1
(45) Date of Patent: May 1, 2012

(54) PROMOTIONAL RECEPTACLE

(76) Inventor: Danny Watson, Wolf City, TX (US)

(*) Notice: Subject to any disclaimer, the term of this patent is extended or adjusted under 35 U.S.C. 154(b) by 438 days.

(21) Appl. No.: 12/329,579

(22) Filed: Dec. 6, 2008

(51) Int. Cl.
*G08B 5/00* (2006.01)

(52) U.S. Cl. ............ 340/815.46; 340/545.6; 340/568.1; 340/568.7; 340/613; 340/693.5; 340/693.6; 340/321; 340/332

(58) Field of Classification Search ............... 340/506, 340/545.6, 568.1, 568.7, 613, 693.5, 693.6, 340/321, 332, 815.46
See application file for complete search history.

(56) References Cited

U.S. PATENT DOCUMENTS

| | | | |
|---|---|---|---|
| 6,293,362 B1 * | 9/2001 | Sasaki et al. | 180/274 |
| 6,454,570 B1 * | 9/2002 | Woods | 434/107 |
| 7,321,304 B1 * | 1/2008 | Soffer | 340/571 |
| 7,378,981 B1 * | 5/2008 | Sachs | 340/691.2 |

* cited by examiner

*Primary Examiner* — Daryl Pope
(74) *Attorney, Agent, or Firm* — Law Office of J. D. Pemberton; John Pemberton

(57) ABSTRACT

A gratuity receptacle that contains a gratuity sensor to detect when gratuity has been inserted into the opening of the gratuity receptacle. When gratuity has been inserted into the gratuity receptacle, the gratuity sensor activates a notification means to alert patrons and employees that gratuity has been inserted into the gratuity receptacle. The notification may be any combination of a visual, motion, and/or a sound notification. The notification may be related to an advertising campaign.

20 Claims, 1 Drawing Sheet

PROMOTIONAL RECEPTACLE

BACKGROUND OF THE INVENTION

1. Technical Field

This invention relates to a combined gratuity collecting and display device that is intended to be placed in bars, restaurants, and other kinds of establishments where tips and gratuities are often given.

2. Description of Related Art

When visiting an establishment where tips and gratuities are often given, there is usually a receptacle, commonly referred to as a "tip jar", where patrons can insert a tip or gratuity. If the establishment is frequented often, or the services of an employee will be used again in the near future, such as a bartender providing drinks, patrons often want the employee to see the patron giving the tip or gratuity in hopes that the employee will give the patron better service in the future. Unfortunately, one problem with the common tip jar is that there is not a signal or some type of notification when a patron inserts a tip or gratuity into the tip jar. Therefore, what is needed is a device and method that provides some type of notification when a tip or gratuity is inserted into the tip jar.

SUMMARY OF INVENTION

The present invention solves the above-described problem by providing a device and method that provides some type of notification when a tip or gratuity is given by a customer or patron. The gratuity receptacle includes an opening that is large enough to accept the type of gratuity typically given by a customer or patron of the establishment where the gratuity receptacle is located. The gratuity is stored in a cavity inside the gratuity receptacle until the gratuity is collected. In use, patrons insert gratuity in the opening and upon release of the gratuity, gravity takes the gratuity to the cavity or in one embodiment, mechanical means transfers the gratuity from the opening to the cavity.

A gratuity sensor detects when gratuity has been inserted into the opening. The gratuity sensor may be a mechanical sensor, motion sensor or some other type of sensor that that is able to detect when the gratuity is traveling from the opening to the cavity that stores the gratuity. In one embodiment, the electronics necessary to operate the gratuity receptacle are integrated into the gratuity receptacle. In another embodiment, the base of the gratuity receptacle contains the electronics necessary to operate gratuity receptacle. The electronics are in communication with the gratuity sensor such that when the gratuity sensor detects the gratuity, a signal is sent to electronics that activate a notification means. The signal may be an electrical signal or a mechanical signal depending on the sensing device contained in the gratuity sensor.

The electronics activate the notification means and notifies those proximate to the gratuity receptacle that gratuity has been added to the gratuity receptacle. The notification may be any combination of a visual, motion, and/or a sound notification. The visual notification may be blinking lights or a rotating scene or advertisement on the gratuity receptacle. The motion notification may be such that the gratuity receptacle vibrates or moves when activated. The sound notification may be a siren or audible tone such as an advertising jingle. Notification means may also include any other means that can notify those proximate to the gratuity receptacle that gratuity has been inserted into the gratuity receptacle.

In use, gratuity is inserted into the opening of the gratuity receptacle. Once the gratuity is inserted, it travels past the gratuity sensor and towards the cavity. The gratuity sensor detects the gratuity and sends a signal to the electronics to activate the notification means thereby notify those proximate to the gratuity receptacle that gratuity has been inserted. Then, after a predetermined amount of time, the notification means is deactivated. To remove the inserted gratuity, the base of gratuity receptacle may be separated from the cavity to allow easy access to the gratuity.

DETAILED DESCRIPTION OF THE INVENTION

Figure 1:
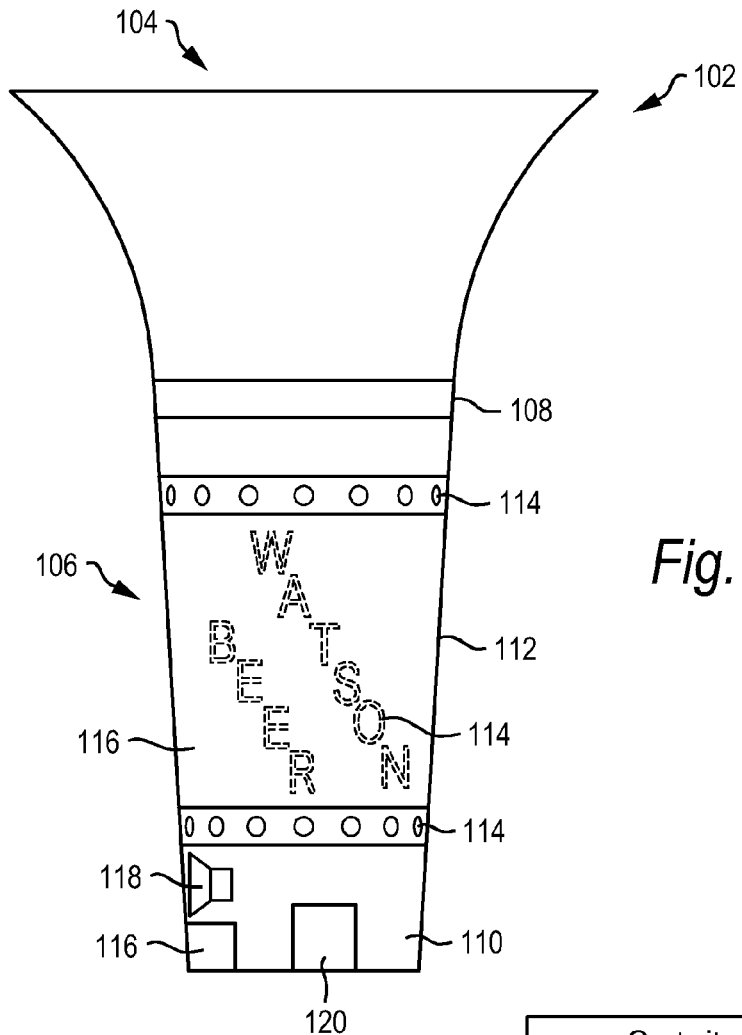
FIG. 1 is an front view of a gratuity receptacle in accordance with an embodiment of the present invention.
Figure 2:
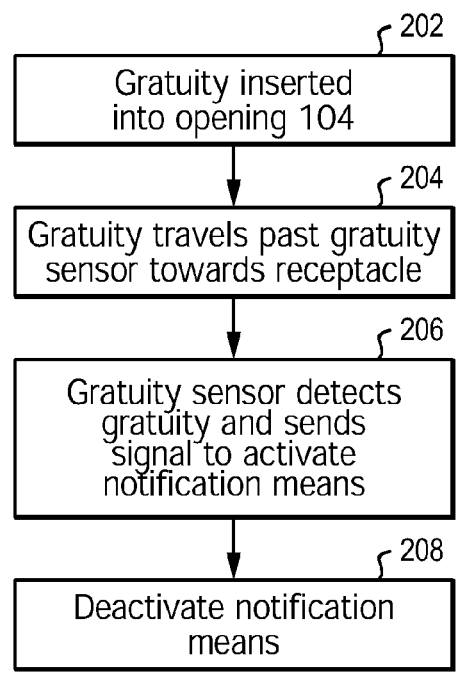
FIG. 2 is a block diagram showing the steps of using the gratuity receptacle in accordance with an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Shown in FIG. 1, gratuity receptacle 102 contains opening 104, cavity 106, gratuity sensor 108, base 110, and notification means 112. Opening 104 is large enough to accept the type of gratuity typically given by a customer or patron of the establishment where the gratuity receptacle 102 is located. Gratuities may include paper money, coins, or other items that may be used to show appreciation. Cavity 106 stores the gratuity that was inserted through opening 104 until the gratuity is collected. Patrons insert the gratuity in opening 104 and upon release of the gratuity, gravity takes the gratuity to cavity 106. In one embodiment, mechanical means transfers the gratuity from opening 104 to cavity 106.

Gratuity sensor 108 detects when gratuity has been inserted into opening 104 and is traveling towards cavity 106. Gratuity sensor 108 may be a mechanical sensor, motion sensor or any other type of sensor that that is able to detect when gratuity is traveling from opening 104 to cavity 106. In one embodiment, gratuity sensor 108 contains means for identifying the monetary value of the gratuity inserted into opening 104 and based on the monetary value of the gratuity, activates one or more notification means 112.

In one embodiment, gratuity sensor 108 is located in the upper half of gratuity receptacle 102. Electronics 120 necessary to operate gratuity sensor 108 are contained within gratuity receptacle 102. Electronics 120 contain at least a processor and a memory accessible to the processor wherein the memory includes the necessary instructions to operate gratuity receptacle 102. In one embodiment, base 110 contains electronics 120. Electronics 120 are in communication with gratuity sensor 108 such that when gratuity sensor 108 detects gratuity traveling from opening 104 to cavity 106, a signal is sent to electronics 120. The signal may be an electrical signal or a mechanical signal depending on the sensing device contained in gratuity sensor 108.

Once electronics 120 receives a signal from gratuity sensor 108, electronics 120 send a signal to activate notification means 112. Notification means 112 contains means for notifying patrons, employees of the establishment where gratuity receptacle 102 is located, and others proximate to gratuity receptacle 102. By way of example and not of limitation, notification means 112 may include any combination of a visual, motion, and/or a sound notification and visual notification 114, motion notification means 116, and sound notification 118 are each a notification means 112 either singularly or in combination with each other. Visual notification 114 may be blinking lights, strobe lights, or any other kind of visual notification that can alert patrons and employees when gratuity is inserted into gratuity receptacle 102. For example, in FIG. 1, the words "Watson Beer" may illuminate when visual notification 114 is activated by electronics 120. Motion notification means 116 may be such that gratuity receptacle 102 vibrates, moves, may be a rotating advertisement, or any other kind of motion notification that can alert patrons and employees when gratuity is inserted into gratuity receptacle 102. For example, in FIG. 1, the portion displaying the words "Watson Beer" may rotate when sound notification 118 is activated by electronics 120. Sound notification 118 may be an audible tone such as a siren, series of tones or melodies, advertising jingle, or any other kind of audible notification that can alert patrons and employees when gratuity is inserted into gratuity receptacle 102. Notification means 112 may include only one or any combination of visual notification 114, motion notification means 116, sound notification 118, or any other means that can notify those proximate to gratuity receptacle 102 that gratuity has been inserted into gratuity receptacle 102.

In one embodiment, notification means 112 is part of an advertising campaign for a product wherein the visual and/or sound notification complement or coincide with a product's advertising campaign. For example, notification means 112 may contain a static visual advertisement that displays a product's logo or symbol that is used to readily identified the product. Then, in one embodiment, when gratuity is inserted into gratuity receptacle 102, visual notification 114 on notification means 112 blink and a sound is played through sound notification 116 wherein the sound relates to the static visual advertisement. The sound may be a sound that is readily identified with the static visual advertisement and complements the product's advertising campaign.

In one embodiment, upon activation of notification means 112, a static visual advertisement begins to move and/or light up. For example, if the product was Budweiser®, then visual notification 114 might be a picture of Clydesdale horses pulling a beer wagon and upon insertion of a gratuity, the horse and beer wagon become animated and move through a scene. The scene may change for each season. For example, in the winter the scene may be a snow covered forest and in the summer the scene may be an open meadow. Notification means 112 may be activated for a few seconds or longer depending on the establishment and the type of notification means 112 used. In one embodiment, notification means 112 is an LCD screen or some other similar type of digital display.

In use, a gratuity is inserted into opening 104, Step 202. Once the gratuity is inserted into opening 104, it travels past gratuity sensor 108 towards cavity 106, Step 204. Gratuity sensor 108 detects the gratuity and sends a signal to activates notification means 112, Step 206. Then, after a predetermined amount of time, notification means 112 is deactivated, Step 208.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A gratuity receptacle comprising:
   an opening for receiving gratuity;
   a gratuity sensor proximate to the opening for detecting when the gratuity is inserted into the opening;
   a cavity for storing the gratuity inserted into the opening;
   a notification means activated by the gratuity sensor when the gratuity sensor detects gratuity, wherein the notification means includes movement of at least a portion of the gratuity receptacle; and
   a base for supporting the gratuity receptacle.

2. The gratuity receptacle of claim 1, wherein the notification means includes a visual notification means.

3. The gratuity receptacle of claim 2, wherein the notification means includes a static image that is part of an advertisement campaign and the static image moves when the gratuity sensor detects gratuity.

4. The gratuity receptacle of claim 2, wherein the visual notification means includes at least one light emitting element.

5. The gratuity receptacle of claim 1, wherein the notification means includes an audible notification means.

6. The gratuity receptacle of claim 1, wherein the notification means includes a motion notification means that is part of an advertisement campaign.

7. The gratuity receptacle of claim 1, wherein cavity is removable from the base to access the gratuity in the receptacle.

8. The gratuity receptacle of claim 1, wherein the notification means includes a visual and an audible notification means.

9. The gratuity receptacle of claim 8, wherein the visual and the audible notification coincide with an advertising campaign.

10. A method for advertising a product when gratuity is inserted into a gratuity receptacle, the method comprising the steps of:
   detecting when gratuity is inserted into a gratuity receptacle;
   activating a notification means to alert patrons and employees that gratuity has been inserted into the gratuity receptacle, wherein the notification means includes rotating at least a portion of the gratuity receptacle; and
   deactivating the notification means after a predetermined amount of time.

11. The method of claim 10 wherein the notification means includes a visual notification means.

12. The method of claim 11 further comprising activating a static image that coincides with an advertisement campaign such that the static image moves when gratuity is inserted into a gratuity receptacle.

13. The method of claim 11 further comprising activating at least one light emitting element when gratuity is inserted into the opening.

14. The method of claim 10 wherein the notification means includes an audible notification means.

15. The method of claim 10 wherein the notification means includes a motion notification means that is part of an advertisement campaign.

16. The method of claim 10 wherein the gratuity receptacle contains a base that is removable to allow access to gratuity in the gratuity receptacle.

17. The method of claim 10 wherein the notification means includes a visual and an audible notification means.

18. The method of claim 17 wherein the visual and the audible notification coincide with an advertising campaign.

19. A gratuity receptacle for providing notification means when gratuity is inserted into the gratuity receptacle, the gratuity receptacle comprising:
   an opening for receiving gratuity;
   a gratuity sensor proximate to the opening for detecting when gratuity is inserted into the opening;
   a cavity for storing the gratuity inserted into the opening;
   a notification means that is activated by the gratuity sensor when the gratuity sensor detects gratuity, wherein the notification means is part of an advertisement campaign and wherein the notification means periodically changes; and
   a base for supporting the gratuity receptacle.

20. The gratuity receptacle of claim 19 wherein the notification means includes a visual and an audible notification means and the visual and the audible notification coincide with the advertising campaign.

\* \* \* \* \*